United States Patent
Dong et al.

(10) Patent No.: US 8,868,395 B2
(45) Date of Patent: Oct. 21, 2014

(54) FAST SIMULATION METHOD FOR INTEGRATED CIRCUITS WITH POWER MANAGEMENT CIRCUITRY

(75) Inventors: He Dong, Winchester, MA (US); Michael Z. Chui, Los Altos Hills, CA (US); Andrey Y. Tarasevich, Campbell, CA (US)

(73) Assignee: Synopsys, Inc., Mountain View, CA (US)

( * ) Notice: Subject to any disclaimer, the term of this patent is extended or adjusted under 35 U.S.C. 154(b) by 1033 days.

(21) Appl. No.: 12/259,166

(22) Filed: Oct. 27, 2008

(65) Prior Publication Data

US 2010/0106476 A1    Apr. 29, 2010

(51) Int. Cl.
*G06F 17/50* (2006.01)
*G06G 7/54* (2006.01)
*G06F 9/455* (2006.01)

(52) U.S. Cl.
CPC ........ *G06F 17/5036* (2013.01); *G06F 17/5009* (2013.01); *G06F 17/50* (2013.01); *G06F 2217/78* (2013.01); *G06F 17/5045* (2013.01)
USPC ............... 703/14; 703/18; 716/109; 716/120; 716/127

(58) Field of Classification Search
CPC . G06F 17/50; G06F 17/5045; G06F 17/5009; G06F 2217/78
USPC ........................ 703/14, 18; 716/109, 120, 127
See application file for complete search history.

(56) References Cited

U.S. PATENT DOCUMENTS

| | | | |
|---|---|---|---|
| 6,345,379 B1* | 2/2002 | Khouja et al. ................. | 716/115 |
| 6,523,155 B1 | 2/2003 | Ruedinger | |
| 6,577,992 B1* | 6/2003 | Tcherniaev et al. ............ | 703/14 |
| 7,409,328 B1 | 8/2008 | McGaughy et al. | |
| 2004/0044510 A1* | 3/2004 | Zolotov et al. .................. | 703/14 |
| 2004/0054974 A1 | 3/2004 | Acar et al. | |
| 2005/0102125 A1* | 5/2005 | Tseng ............................. | 703/14 |
| 2006/0015312 A1 | 1/2006 | Tsukamoto | |
| 2006/0161413 A1* | 7/2006 | Wei et al. ........................ | 703/14 |
| 2008/0208553 A1 | 8/2008 | Borah et al. | |
| 2009/0030665 A1* | 1/2009 | Kerns et al. ..................... | 703/14 |

* cited by examiner

*Primary Examiner* — Omar Fernandez Rivas
*Assistant Examiner* — Angel Calle
(74) *Attorney, Agent, or Firm* — Bever, Hoffman & Harms, LLP; Jeanette S. Harms

(57) ABSTRACT

In a fast simulation technique, the output node of a power supply module of the integrated circuit can be designated as an ideal power node. At this point, the power supply module can be designated a fan-in block and any blocks connected to the power node can be designated fan-out blocks. Then, DC initialization and transient simulation for each time step can be performed for the circuit. During the transient simulation, any inter-relationship of the fan-out blocks can be determined and a sensitivity model can be calculated for each fan-out block. Because the power node is designated as an ideal power node, the results of the sensitivity model for each fan-out block can be added asynchronously to a total loadings of the power node. The total loadings can be loaded into a matrix, which is computed for the fan-in block, and a simulation waveform point can be output.

12 Claims, 7 Drawing Sheets

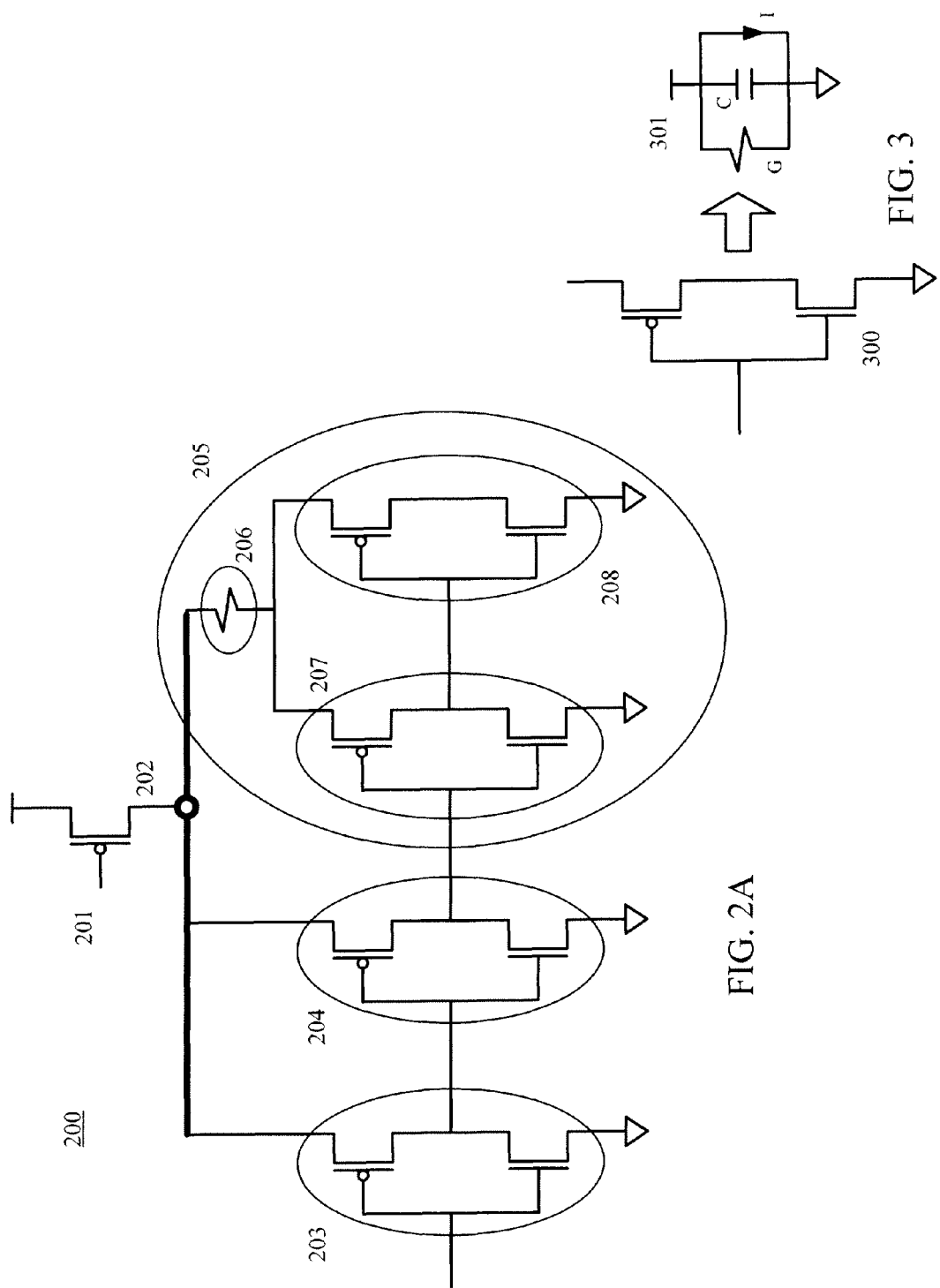

FAST SIMULATION METHOD FOR INTEGRATED CIRCUITS WITH POWER MANAGEMENT CIRCUITRY

BACKGROUND OF THE INVENTION

1. Field of the Invention

The present invention relates to the simulation of integrated circuits (ICs) and in particular to providing a fast simulation method for ICs with power management circuitry.

2. Related Art

As IC technology has shrunk to 90 nm and below, total power consumption has become one of the most important concerns in system-on-chip chip designs. Known techniques such as power gating, voltage scaling, and variable threshold CMOS have been adopted to reduce standby leakage current and dynamic power dissipation. However, as explained below, such techniques pose a significant challenge to both pre-layout and post-layout full chip verification due to the extremely large size of the matrices of the nodal analysis equation sets required for simulation.

A system-on-chip (SoC) design typically includes at least one power supplying module, which has at least one output node that serves as the voltage supplying node of other modules. An exemplary power supplying module may include a charge pump, a regulator, a power switch, and/or a transistor to provide one or more power supplies for the design.

SPICE is a well-known general-purpose circuit simulation program developed by the University of California at Berkeley. SPICE can simulate circuits including, for example, resistors, capacitors, inductors, voltage sources, current sources, transmission lines, and common semiconductor devices. Fast-SPICE simulators use various algorithms to improve performance over traditional SPICE simulators.

One exemplary algorithm to improve performance includes partitioning in which a circuit is broken up into smaller blocks at the boundary of ideal voltage source nodes and weak coupling nodes (e.g. at the gates of MOSFET devices). For example, as shown in FIG. 1A, a conventional fast-SPICE simulator partitions a circuit 100 into two blocks 110 and 111 because both blocks are directly connected to the ideal voltage source. Note that only a limited number of exemplary circuit elements (e.g. transistors and a resistor) are shown in FIG. 1A, whereas an actual circuit would typically include many other circuit elements.

Notably, when using a fast-SPICE simulator blocks 110 and 111 can be simulated at different rates according to their latency during simulation. As a result, a fast-SPICE simulator may provide speed increases of 10×-1000× with acceptable lose of accuracy. However, a fast-SPICE simulator is typically inefficient for SoC circuits because the output node(s) of the power supply module (in FIG. 1A, a power node 102 of a power supply module 101) are non-ideal and therefore the simulator must operate on a large, flattened partition. Specifically, the fast-SPICE simulator must synchronously simulate the circuits within block 111.

Some advanced simulators, such as HSIM, can further partition the large blocks into second-level blocks and then take advantage of the isomorphic matching. For example, as shown in FIG. 1B (which ignores small block 110 (FIG. 1A) for simplicity), an HSIM simulator cuts the circuit 100 at power node 102 and partitions to generate a plurality of channel-connected blocks (CCBs) 101, 103, 104, and 105. Note that simulation tools generally define CCBs at the transistor level. These CCBs are relatively simple circuits (wherein the invertors shown are illustrative, and not limiting).

Because the output node of power supply module 101, i.e. power node 102, is a non-ideal voltage supply source, CCBs 101, 103, 104, and 105 must be evaluated simultaneously (i.e. synchronously) to provide an accurate simulation of power node 102. Because of its size, CCB 105 can be further partitioned by an HSIM simulator. In this example, CCB 105 can be further partitioned into CCBs 106, 107, and 108. Note various simulation tools determine the membership of cut groups (i.e. blocks formed by partitioning) in different ways. For example, in one embodiment, a simulation tool may determine a cut group based on the number of CCBs connected to the cut.

Notably, once again CCBs 106, 107, and 108 must be evaluated synchronously, i.e. these CCBs also form flattened partitions. Thus, CCBs 101, 103, 104, and 105 can be characterized as a first-level cut group, whereas CCBs 106, 107, and 108 can be characterized as a second-level cut group. Note that the evaluation results from CCB 105 can be used in the synchronous evaluation of CCBs 103, 104, and 105. Therefore, despite this hierarchical partitioning, an HSIM simulator typically has sub-optimal, i.e. relatively slow, results when simulating large (e.g. SoC) circuits having non-ideal power supplying modules.

Therefore, a need arises for a fast simulation method for circuits with power management circuitry.

SUMMARY OF THE INVENTION

In accordance with a fast simulation method, the output node of a power supply module (i.e. a non-ideal power node) of the integrated circuit can be designated as an ideal power node. The circuit can be partitioned into blocks, wherein the power supply module can be designated a fan-in block and any blocks connected to the power node can be designated fan-out blocks. At this point, DC initialization can be performed.

Then, for each time step, transient simulation can be performed. For example, in an initial step of transient simulation, any inter-relationship of the fan-out blocks can be determined. In one embodiment, this inter-relationship can include identifying simulation intervals for each fan-out block as well as external trigger events.

If an evaluation of that fan-out block is to occur at that time step, then a sensitivity model can then be calculated for that fan-out block. This sensitivity model can include the conductance, capacitance, and current loadings of that fan-out block. Advantageously, because the power node is designated as an ideal power node, the results of the sensitivity model for each fan-out block can be added asynchronously to a total loadings of the power node. In one embodiment, the contribution can be computed by subtracting the present loading value from the last loading value, which was computed during the last simulation, and adding the difference to the total loadings for that block (i.e. the conductance, capacitance, and current loadings).

Being able to evaluate fan-out blocks asynchronously allows a simulator to advantageously perform such evaluations in parallel (for any number of fan-out blocks), in any order, and/or whenever system resources (even limited system resources) are available. Thus, the ability to evaluate such fan-out blocks asynchronously can provide significant savings in time and optimize utilization of system resources, thereby ensuring maximized system efficiency and flexibility.

In one embodiment, asynchronously adding results includes tracking the total loadings using a global data structure. In one embodiment, tracking the total loadings includes ignoring any inactive fan-out block. After tracking, the total loadings can be loaded into a matrix (e.g. a Jacobin matrix), which is computed for each fan-in block, and a simulation waveform point can be output. The above-described transient simulation steps can be performed for each designated time step.

A computer-readable medium is also described herein. This computer-readable medium stores computer instructions that, when executed on a computer, generate signals that perform the above-described steps to simulate an integrated circuit.

BRIEF DESCRIPTION OF THE DRAWINGS

FIG. 2A illustrates an exemplary partitioning that can designate a non-ideal power node as an ideal power node, thereby allowing asynchronous evaluation of any fan-out blocks connected to that power node.

FIG. 3 illustrates an exemplary evaluation of a CCB to generate a sensitivity model that considers loading effects of that CCB. This sensitivity model can include conductance, capacitance, and current.

DETAILED DESCRIPTION OF THE DRAWINGS

In a fast simulation technique, the output node of a power supply module of an integrated circuit can be designated as an ideal power node. At this point, the power supply module can be designated a fan-in block and any blocks connected to the power node can be designated fan-out blocks. As described in further detail below, because a non-ideal power node is designated as an ideal power node, the fan-out blocks can be evaluated asynchronously, thereby ensuring maximum time savings and system flexibility during simulation.

Figure 1A:
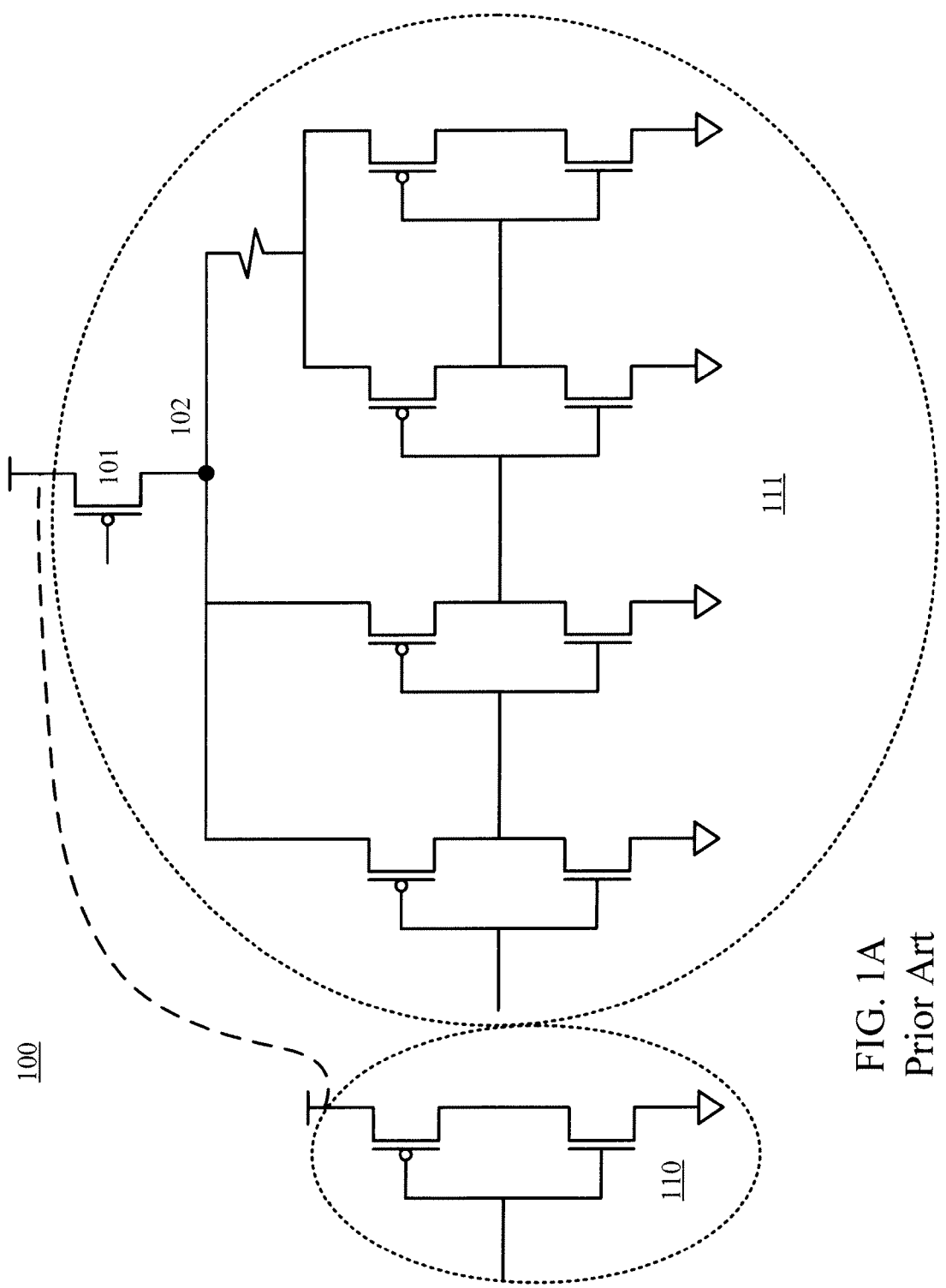
FIG. 1A illustrates how a conventional simulator evaluates blocks of circuits connected to an ideal power node, wherein circuits within each block must be evaluated synchronously.
Figure 1B:
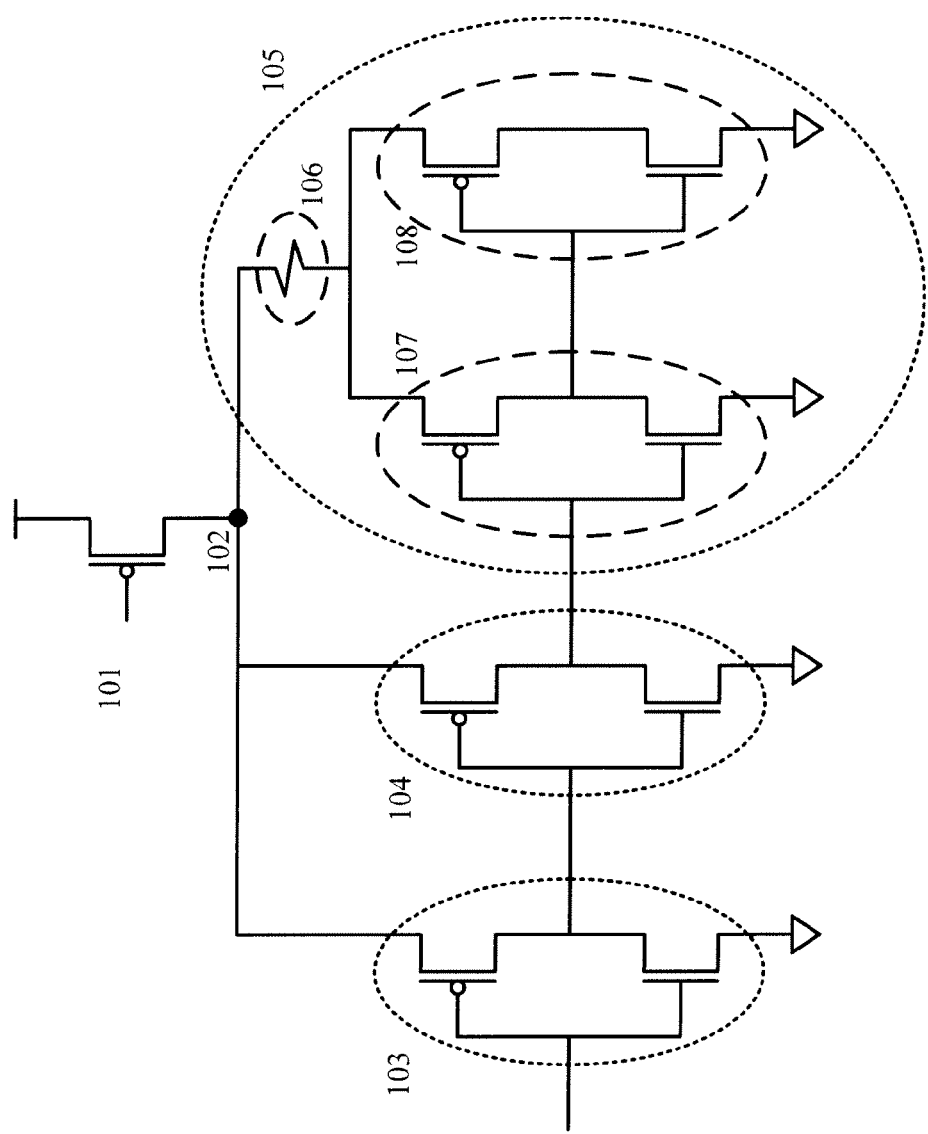
FIG. 1B illustrates a conventional partitioning of a circuit that cuts at a non-ideal power node and weak coupling nodes, thereby resulting in hierarchical partitions that still require synchronous evaluation.
Figure 2B:
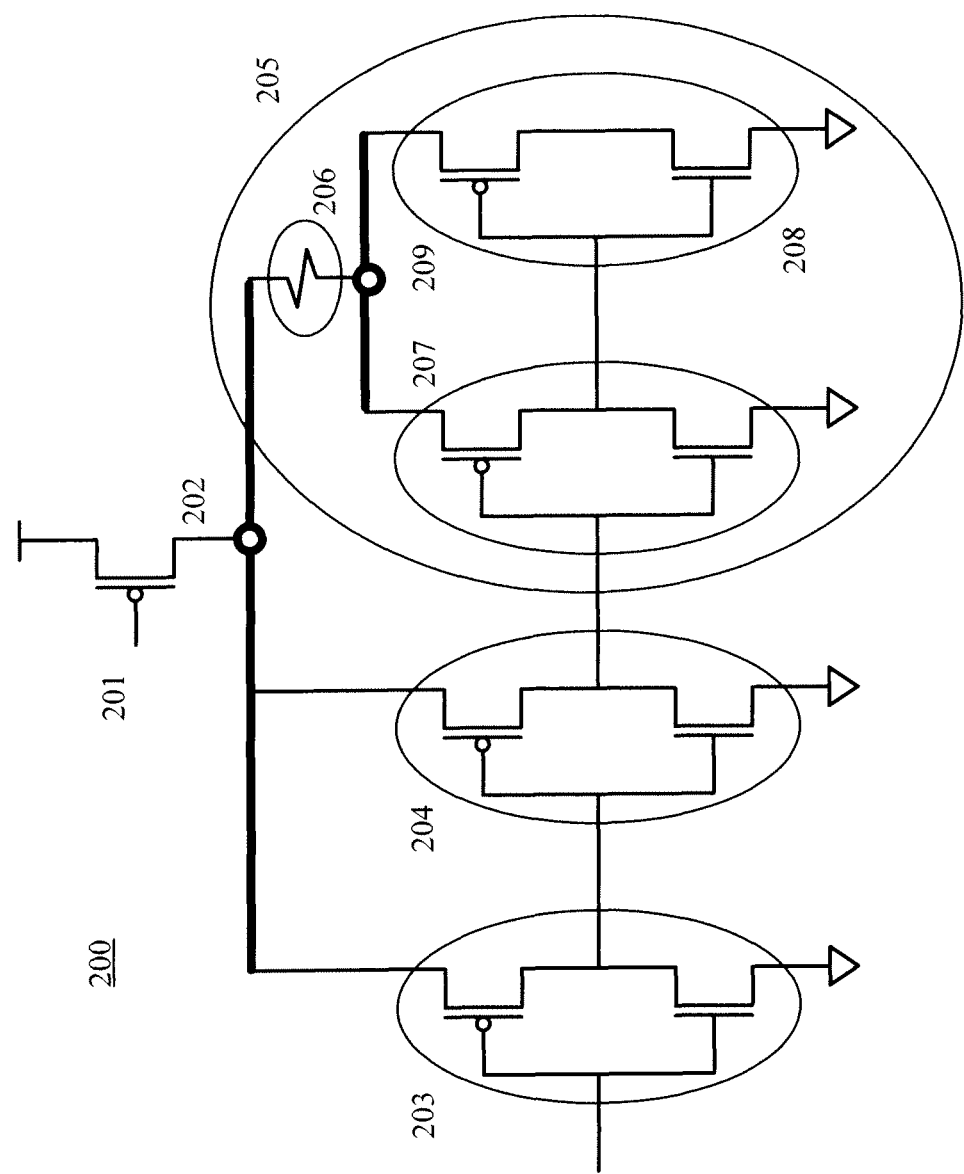
FIG. 2B illustrates another exemplary partitioning that can designate multiple non-ideal power nodes as ideal power nodes, thereby allowing asynchronous evaluation of any fan-out blocks connected to those power nodes.

FIG. 2A illustrates a simplified circuit 200 that demonstrates aspects of a fast simulation method. During simulation, circuit 200 can be partitioned into blocks 201, 203, 204, and 205. Specifically, circuit 200 can be partitioned into a plurality of channel-connected blocks (CCBs) 203, 204, and 205 that are cut from a power supplying module 201. Note that an output (power) node 202 of power supplying module 201 is actually a non-ideal power node. However, in accordance with one aspect of the described fast simulation method, power node 202 can instead be designated as an ideal power node. As a result, CCBs 203, 204, and 205 can be advantageously evaluated asynchronously during simulation.

Note that in a typical IC circuit, the CCBs connected to a power node may number in the hundreds or even thousands. Being able to evaluate CCBs asynchronously allows a simulator to advantageously perform such evaluations in parallel (for any number of CCBs), in any order, and/or whenever system resources (even limited system resources) are available. Thus, the ability to evaluate such CCBs asynchronously can provide significant savings in time and optimize utilization of system resources, thereby ensuring maximized system efficiency and flexibility.

Note that CCB 205, which can be characterized a cut group by a simulator, can be further portioned into CCBs 206, 207, and 208. In one embodiment, CCBs 206, 207, and 208 can be simulated synchronously using a hierarchical solver. In another embodiment, shown in FIG. 2B, CCBs 207 and 208 can be simulated asynchronously by designating node 209 an ideal power node (and characterizing CCB 206 as a power source module), thereby providing further system efficiencies. Determining whether synchronous/asynchronous simulation is performed in the fan-out blocks may be based on the size of the fan-out block. This size may be set using empirical results from various simulations and then determining an appropriate size threshold based on a cost function. Note that although two, designated ideal nodes 202 and 209 are provided in circuit 200, other circuits may include any number of designated ideal nodes. Moreover, the designation of ideal nodes for non-ideal nodes can be done for any number of levels in a recursive manner.

In any case, as known by those skilled in the art of simulation, the evaluations of CCBs 206, 207, and 208 are required before the evaluation of CCB 205 can be performed. FIG. 3 illustrates an exemplary evaluation of a CCB 300 in which a sensitivity model 301 (a Norton Equivalent circuit) can be generated, wherein sensitivity model 301 can include conductance G (the reciprocal of resistance), capacitance C, and current I.

Figure 4:
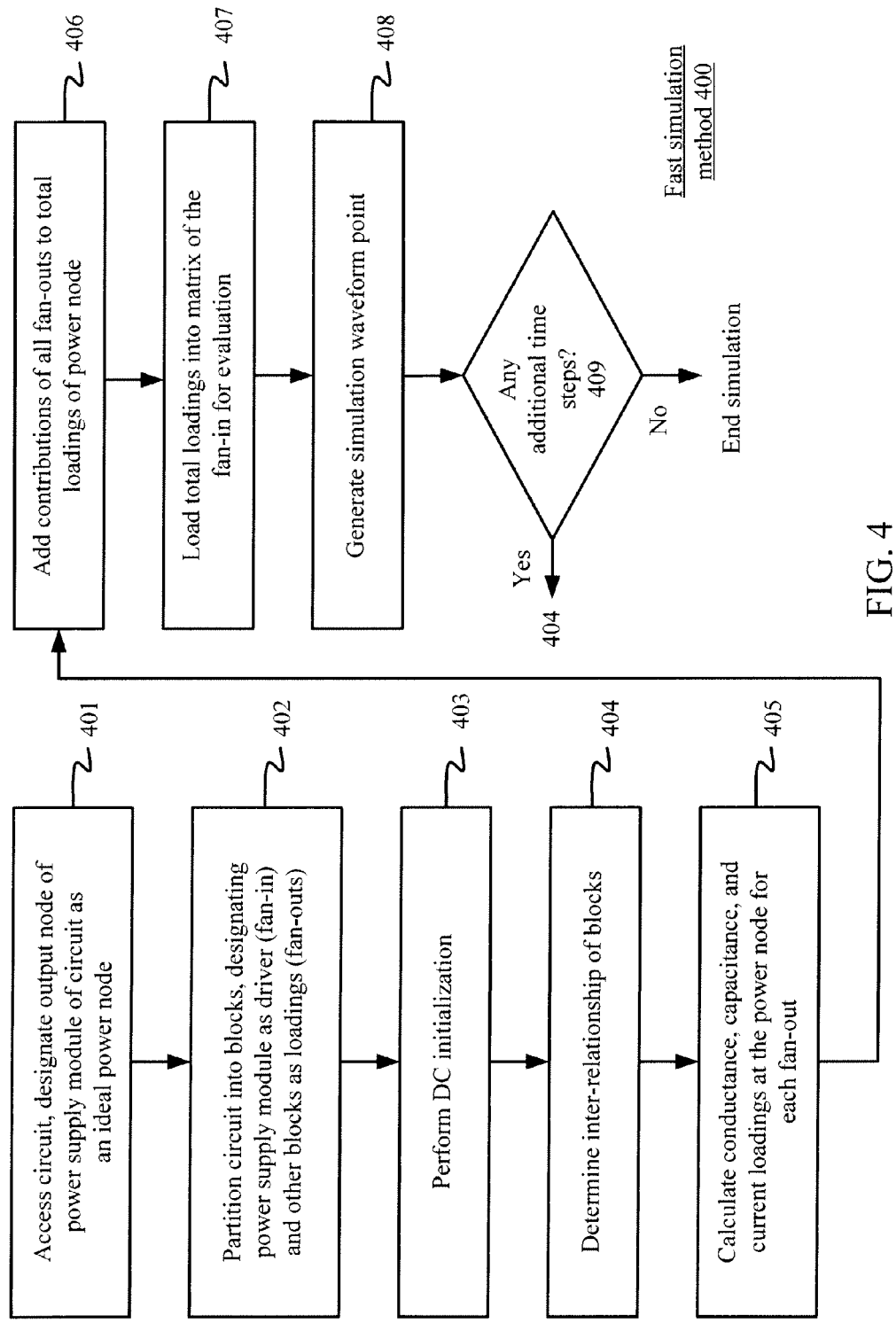
FIG. 4 illustrates an exemplary simulation technique that designates the output node of a power supplying module (i.e. the non-ideal power node) as an ideal power node, thereby allowing asynchronous evaluation of any fan-out block connected to that power node.

FIG. 4 illustrates an exemplary fast simulation method 400 that includes designating a non-ideal power node as an ideal power node. In step 401, the design of a circuit can be accessed. In a typical embodiment, this design can be accessed as a netlist. Note that a netlist may be generated using any conventional schematic entry system and may follow the same syntax format as that used by fast-SPICE. At this point, an output node of a power supplying module (i.e. the power node) in the design can be designated as an ideal power node. Step 402 can then partition the IC circuit into blocks, wherein the power supply module can be designated as a driver (i.e. a fan-in block) of that power node, and other blocks can be designated as the loadings (i.e. the fan-out blocks or CCBs) of that power node. In step 403, DC initialization can be performed to obtain the dynamic voltage state of the IC circuit at the starting time t=0.

Figure 5:
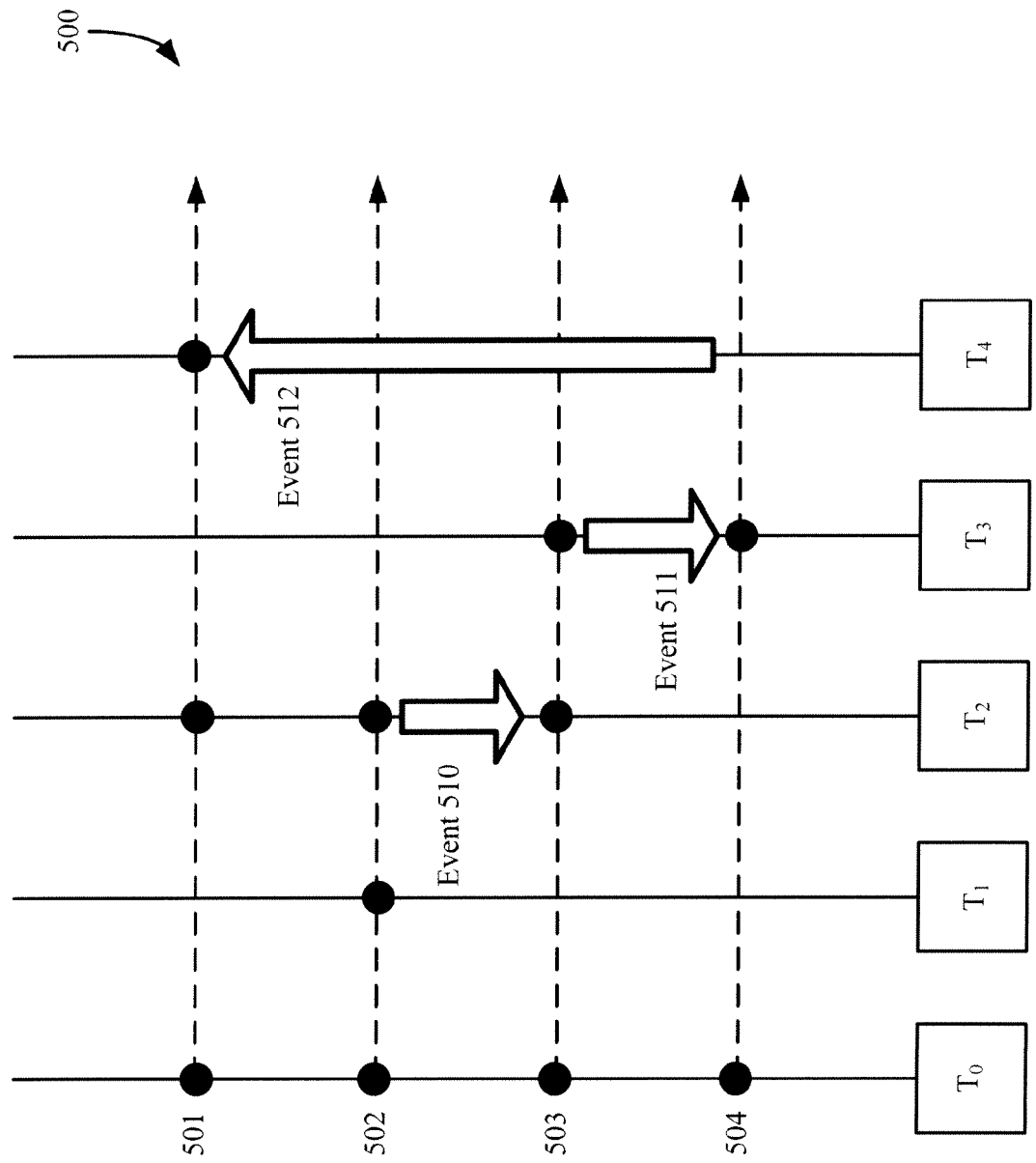
FIG. 5 illustrates an exemplary multi-rate, event driven method.

In step 404, the inter-relationship of the fan-out blocks can be determined by, for example, examining the simulation intervals of the blocks (called multi-rate) and whether the blocks are event-driven. FIG. 5 illustrates an exemplary multi-rate, event-driven system 500 that includes a fan-in block 501 and fan-out blocks 502-504. In system 500, all blocks 501-504 are evaluated (i.e. simulated) at an initial time $T_0$ (designated by the black circles). Subsequently, blocks 501-504 are evaluated at different intervals, i.e. block 501 is evaluated at times $T_2$ and $T_4$, block 502 is evaluated at times $T_1$ and $T_2$, block 503 is evaluated at times $T_2$ and $T_3$, and block 504 is evaluated at time $T_3$.

The simulation intervals for each block 501-504 are determined by a plurality of factors, which can be characterized as relating to either the internal latency of the block or external trigger events. The internal latency of the block includes factors such as the rate of voltage changing, the charging current for each node capacitance, etc. The internal latency of the block is considered so as to avoid abrupt voltage or current changing in one step.

FIG. 5 illustrates that system 500 has three external trigger events 510, 511, and 512. Note that in conventional simulators, events are generated by fan-in blocks to trigger the simulation of fan-out blocks. In accordance with one preferred embodiment, the events can be generated by the fan-out blocks. For example, in system 500, block 502 generates event 510, which triggers the simulation of block 503; block 503 generates event 511, which triggers the simulation of block 504; and block 504 generates event 512, which triggers the simulation of block 501. Note that an event can result from a physical connection of the blocks. For example, referring back to FIG. 2A, CCB 203 provides an output to CCB 204. Therefore, CCB 203 could be characterized as generating an event, which triggers the simulation of CCB 204 (similar to blocks 502 and 503).

Referring back to FIG. 4, in step 405, the sensitivity model for each fan-out block can be calculated. In one embodiment, this sensitivity model can include calculating the conductance G, capacitance C, and current I at the power node for that fan-out block. In one preferred embodiment, a hierarchical solver can be used to compute the sensitivity models for each cut group and a conventional solver can be used for any other fan-out block. In one embodiment, when multiple fan-out blocks share the same topology and have identical terminal voltages and currents, only one fan-out block is calculated because other fan-out blocks can advantageously re-use the result of the first-computed fan-out block (this re-use is also called isomorphic matching). An exemplary hierarchical solver and a more detailed description of isomorphic matching are provided in U.S. Pat. No. 6,577,992, issued to Tcherniaev on May 17, 1999, and incorporated by reference herein.

Step 406 can add the contributions of all fan-out blocks to the total loadings of the power node associated with the power supplying module. These total loadings include the current I, conductance G, and capacitance C calculated in step 405. Note that as described in FIG. 5, each fan-out block has its own simulation interval. In one embodiment, when the total loadings for that fan-out block are calculated, the results are compared to the results of the previous simulation interval, i.e. $\Delta I = I - I_{last}$, $\Delta G = G - G_{last}$, $\Delta C = C - C_{last}$. These delta values are then added to the total loadings of the designated ideal power node. Because the first simulation performed (e.g. the simulation performed at time step $T_0$ in FIG. 5) has no comparison, the total loadings for those blocks include the currents, conductances, and capacitances calculated in step 405.

In one embodiment, the total loadings for the power node (e.g. power node 202 of FIG. 2A/2B) can be tracked by a global data structure. Note that because of the asynchronous evaluation, the results from each fan-out block may be added to the global data structure when they become available (i.e. in an incremental manner). Thus, the global data structure can track all results from all fan-out blocks. In one embodiment, when a fan-out block is inactive during a specific time step, that fan-out block can be ignored during tracking. In other words, the global data structure can track all results from all fan-out blocks.

In step 407, the total loadings can be loaded into a matrix of the fan-in block (e.g. power supply module 201 in FIG. 2A/2B) when it is evaluated. An exemplary Jacobin matrix to compute current is:

$$[I] = [G] \times [V]$$

wherein [G] is a matrix of conductance, [V] is a matrix of voltage, and [I] is a matrix of current. This computation is known by those skilled in the art of simulation and therefore is not explained in detail herein. In general, this equation can provide linearization to a non-linear solution. Step 408 can generate a simulation waveform point.

Note that a waveform comprises a plurality of individual points, wherein each point (called a simulation waveform point herein) is calculated at each time step during transient simulation. In fast simulation method 400, steps 404-408 provide transient simulation of the IC circuit. Therefore, step 409 can determine whether any additional time steps are designated for the simulation. (Note that the total simulation time, i.e. the number of time steps, is specified in the input files, which is known by those skilled in the art of simulation.) If so, then method 400 returns to step 404. If not, then method 400 ends.

Figure 6:
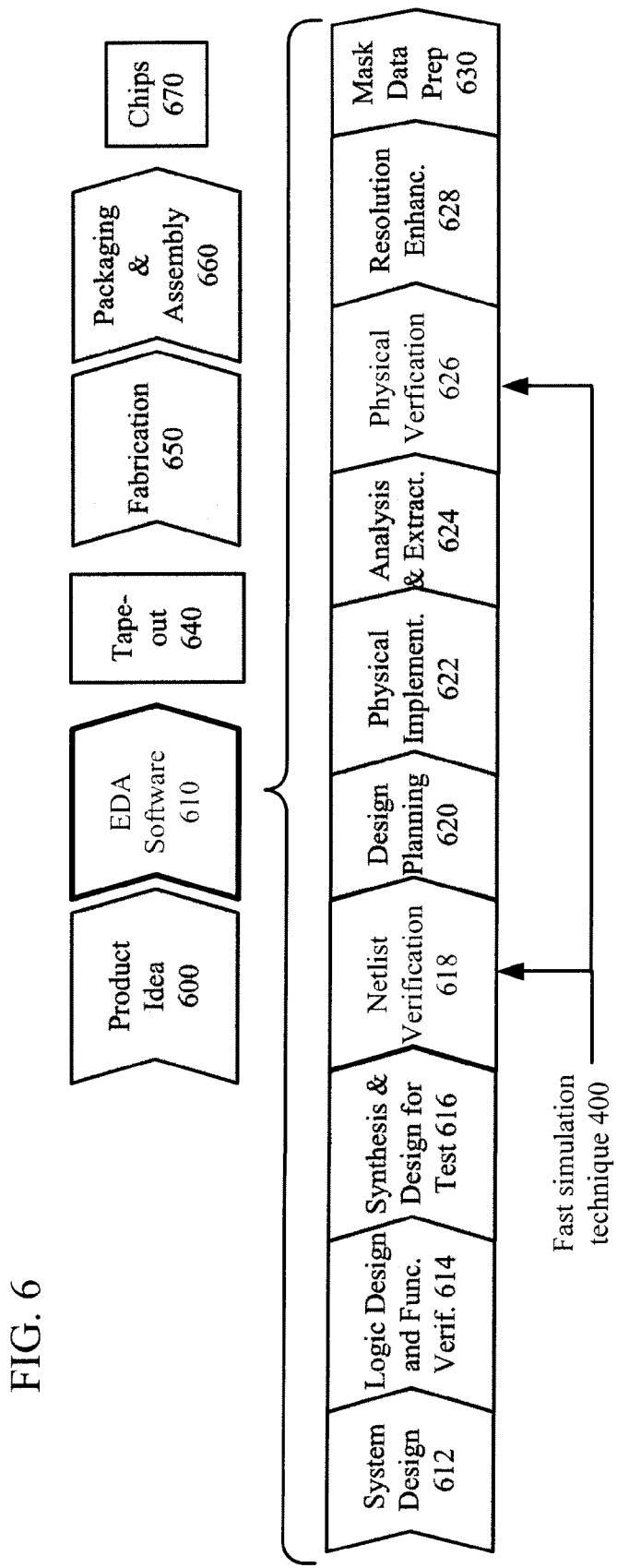
FIG. 6 illustrates an exemplary digital ASIC design flow that can include the simulation technique of FIG. 4.

FIG. 6 shows a simplified representation of an exemplary digital ASIC design flow. At a high level, the process starts with the product idea (step 600) and is realized in an EDA software design process (step 610). When the design is finalized, it can be taped-out (event 640). After tape out, the fabrication process (step 650) and packaging and assembly processes (step 660) occur resulting, ultimately, in finished chips (result 670).

The EDA software design process (step 610) is actually composed of a number of steps 612-630, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components steps of the EDA software design process (step 610) will now be provided:

System design (step 612): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 614): At this stage, the VHDL or verilog code for modules in the system is written and the design is checked for functional accuracy. More specifically, does the design as checked to ensure that produces the correct outputs. Exemplary EDA software products from Synopsys, Inc. that can be used at this step include VCS, VERA, DesignWare®, Magellan, Formality, ESP and LEDA products.

Synthesis and design for test (step 616): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler, Tetramax, and DesignWare® products.

Netlist verification (step 618): At this step, the netlist is checked for compliance with timing constraints and for correspondence with the VHDL/Verilog source code. Exemplary EDA software products from Synopsys, Inc. that can be used at this step include Formality, PrimeTime, VCS, and HSIM+ products. In one embodiment, the HSIM+ product can include the above-described fast simulation method 400 (FIG. 4). In one embodiment, the simulation can include the partitioning and the asynchronous simulation as described in reference to FIG. 2A.

Design planning (step 620): Here, an overall floorplan for the chip is constructed and analyzed for timing and top-level routing. Exemplary EDA software products from Synopsys, Inc. that can be used at this step include Astro and IC Compiler products.

Physical implementation (step 622): The placement (positioning of circuit elements) and routing (connection of the same) occurs at this step. Exemplary EDA software products from Synopsys, Inc. that can be used at this step include the Astro and IC Compiler products.

Analysis and extraction (step 624): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 626): At this step various checking functions are performed to ensure correctness for: manufacturing, electrical issues, lithographic issues, and circuitry. Exemplary EDA software products from Synopsys, Inc. that can be used at this step include the Hercules and HSIM+ products. In one embodiment, the HSIM+ product can include the above-described fast simulation method 400 (FIG. 4). Note that post-layout simulation, which is typically performed during physical verification, can include the partitioning and the asynchronous simulation as described in reference to FIG. 2B.

Resolution enhancement (step 628): This step involves geometric manipulations of the layout to improve manufacturability of the design. Exemplary EDA software products from Synopsys, Inc. that can be used at this step include Proteus, ProteusAF, and PSMGen products.

Mask data preparation (step 630): This step provides the "tape-out" data for production of masks for lithographic use to produce finished chips. Exemplary EDA software products from Synopsys, Inc. that can be used at this step include the CATS® family of products.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent.

For example, the above-described fast simulation technique can be advantageously implemented in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of microcontrollers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Accordingly, it is intended that the scope of the invention be defined by the following Claims and their equivalents.

The invention claimed is:

1. A fast simulation method comprising:
   accessing a netlist of a circuit;
   identifying an output node of a power supply module of the circuit as a power node;
   designating the power node an ideal power node;
   partitioning the circuit into blocks, wherein the power supply module is designated a fan-in block and any blocks connected to the power node are designated fan-out blocks;
   performing DC initialization for the circuit; and
   for each time step:
      determining any inter-relationship of the fan-out blocks, the determining any inter-relationship including identifying simulation intervals for each fan-out block;
      calculating a sensitivity model for each fan-out block, the sensitivity model including conductance, capacitance, and current loadings;
      asynchronously adding results of the sensitivity model for each fan-out block to a total loadings of the power node, the total loadings including delta values calculated based on results of a previous simulation interval and added to the total loadings;
      loading the total loadings into a Jacobian matrix computed for the fan-in block; and
      outputting a simulation waveform point.

2. The method of claim 1, wherein asynchronously adding results includes tracking the total loadings using a global data structure.

3. The method of claim 2, wherein tracking the total loading includes ignoring any inactive fan-out block.

4. The method of claim 1, wherein a first simulation has delta values of zero for the total loadings.

5. The method of claim 1, wherein circuits within each fan-out block are synchronously simulated.

6. The method of claim 1, further including partitioning at least one fan-out block, designating an other ideal node in that fan-out block, and asynchronously simulating circuits fed by the other ideal node.

7. A non-transitory, computer-readable medium storing computer instructions that, when executed on a computer, generate signals that perform steps to simulate an integrated circuit, the steps comprising:
   accessing a netlist of a circuit;
   identifying an output node of a power supply module of the circuit as a power node;
   designating the power node an ideal power node;
   partitioning the circuit into blocks, wherein the power supply module is designated a fan-in block and any blocks connected to the power node are designated fan-out blocks;
   performing DC initialization for the circuit; and
   for each time step:
      determining any inter-relationship of the fan-out blocks, the determining any inter-relationship including identifying simulation intervals for each fan-out block;
      calculating a sensitivity model for each fan-out block, the sensitivity model including conductance, capacitance, and current loadings;
      asynchronously adding results of the sensitivity model for each fan-out block to a total loadings of the power node, the total loadings including delta values calculated based on results of a previous simulation interval and added to the total loadings;

loading the total loadings into a Jacobian matrix computed for the fan-in block; and outputting a simulation waveform point.

8. The computer-readable medium of claim 7, wherein asynchronously adding results includes tracking the total loadings using a global data structure.

9. The computer-readable medium of claim 8, wherein tracking the total loading includes ignoring any fan-out block.

10. The computer-readable medium of claim 7, wherein a first simulation has delta values of zero for the total loadings.

11. The computer-readable medium of claim 7, wherein circuits within each fan-out block are synchronously simulated.

12. The computer-readable medium of claim 7, further including partitioning at least one fan-out block, designating an other ideal node in that fan-out block, and asynchronously simulating circuits fed by the other ideal node.

* * * * *